US012438694B2

(12) United States Patent
Caullery et al.

(10) Patent No.: US 12,438,694 B2
(45) Date of Patent: Oct. 7, 2025

(54) TRIPLICATION-BASED FAULT ATTACK COUNTERMEASURE

(71) Applicant: QUALCOMM Incorporated, San Diego, CA (US)

(72) Inventors: Florian Reneld Ghislain Caullery, Cannes (FR); Frederic Amiel, Nice (FR); Nicolas Thaddee Courtois, Mougins (FR)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 18/353,761

(22) Filed: Jul. 17, 2023

(65) Prior Publication Data

US 2025/0030535 A1 Jan. 23, 2025

(51) Int. Cl.
*H04L 9/00* (2022.01)
(52) U.S. Cl.
CPC .................. *H04L 9/004* (2013.01)
(58) Field of Classification Search
CPC ..................................... H04L 9/004
USPC ................................... 713/189
See application file for complete search history.

(56) References Cited

U.S. PATENT DOCUMENTS 12,231,532 B1* 2/2025 Maiti ............ H04L 9/0819
2024/0377669 A1* 11/2024 Jung ............ G02F 1/133603

OTHER PUBLICATIONS

Barenghi A., et al., "Countermeasures Against Fault Attacks on Software Implemented AES: Effectiveness and Cost", Embedded Systems Security, ACM, 2 Penn Plaza, Suite 701 New York NY 10121-0701 USA, Oct. 24, 2010, 10 Pages, XP058173677, DOI: 10.1145/1873548.1873555 ISBN: 978-1-4503-0078-0, Section 2.2, 3.
International Search Report and Written Opinion—PCT/US2024/037248—ISA/EPO—Oct. 17, 2024.
Shahmirzadi A.R., et al., "Clock Glitch Versus SIFA", 2020 IEEE International Symposium on Defect and Fault Tolerance in Vlsi and Nanotechnology Systems (DFT), IEEE, Oct. 19, 2020, XP033856042, 6 Pages, DOI: 10.1109/DFT50435.2020.9250822 [retrieved on Nov. 6, 2020] Section III. D.

* cited by examiner

*Primary Examiner* — Michael S McNally
(74) *Attorney, Agent, or Firm* — Polsinelli

(57) ABSTRACT

Systems and techniques are provided for secure processing. For instance, a process can include: providing an input value to generate a first output value; obtaining a plurality of first intermediate output values based on a function of the first output value and a tweak value; embedding the plurality of first intermediate output values into a mathematical structure; obtaining a plurality of second intermediate output values, wherein the plurality of second intermediate output values are a function of the plurality of first intermediate output values, a random number, and an inverse of the tweak value; determining a most common value of the plurality of second intermediate output values; obtaining a third intermediate value, the third intermediate value based on a function of the most common value and an inverse of the random number; projecting the third intermediate value from the mathematical structure to obtain a second output value for output.

31 Claims, 6 Drawing Sheets

TRIPLICATION-BASED FAULT ATTACK COUNTERMEASURE

FIELD

The present disclosure generally relates to secure computing. For example, aspects of the present disclosure relate to systems and techniques for triplication-based fault attack countermeasures for secure processing.

BACKGROUND

Computing devices can store sensitive data owned by users or enterprises, with firmware or operating system software on the computing devices. To help secure computing devices, the firmware or software may include security measures to protect against various security threats, e.g., brute force attacks, disabling secure boot/trust boot, and/or avoiding side channel attacks on the computing devices.

A physical attack may be a class of attacks on computing devices in which an attacker has physical access to the computing device and may perform non-destructive attempts to extract information from the computing device, for example, by measuring power consumption of the device when performing certain tasks, inducing errors, such as flipped bits or induced power glitching, and so forth to help find subtle physical differences that may occur when certain operations are performed. Consequently, techniques to help mitigate physical attacks may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing delegated attestation. In one illustrative example, an apparatus for secure processing is provided that includes a memory system and a processor system (e.g., implemented in circuitry) coupled to the memory system. The processor system is configured to: provide an input value to an algorithm to generate a first output value; obtain a tweak value; obtain a plurality of first intermediate output values, wherein the plurality of first intermediate output values are based on a function of the first output value and the tweak value; embed the plurality of first intermediate output values into a mathematical structure; obtain a plurality of second intermediate output values, wherein the plurality of second intermediate output values are a function of the plurality of first intermediate output values, a random number, and an inverse of the tweak value; determine a most common value of the plurality of second intermediate output values; obtain a third intermediate value, the third intermediate value based on a function of the most common value and an inverse of the random number; project the third intermediate value from the mathematical structure to obtain a second output value; and output the second output value.

As another example, a method for secure processing is provided. The method includes providing an input value to an algorithm to generate a first output value; obtaining a tweak value; obtaining a plurality of first intermediate output values, wherein the plurality of first intermediate output values are based on a function of the first output value and the tweak value; embedding the plurality of first intermediate output values into a mathematical structure; obtaining a plurality of second intermediate output values, wherein the plurality of second intermediate output values are a function of the plurality of first intermediate output values, a random number, and an inverse of the tweak value; determining a most common value of the plurality of second intermediate output values; obtaining a third intermediate value, the third intermediate value based on a function of the most common value and an inverse of the random number; projecting the third intermediate value from the mathematical structure to obtain a second output value; and outputting the second output value.

In another example, a non-transitory computer-readable medium is provided that has stored thereon instructions that, when executed by a processor system, cause the processor system to: provide an input value to an algorithm to generate a first output value; obtain a tweak value; obtain a plurality of first intermediate output values, wherein the plurality of first intermediate output values are based on a function of the first output value and the tweak value; embed the plurality of first intermediate output values into a mathematical structure; obtain a plurality of second intermediate output values, wherein the plurality of second intermediate output values are a function of the plurality of first intermediate output values, a random number, and an inverse of the tweak value; determine a most common value of the plurality of second intermediate output values; obtain a third intermediate value, the third intermediate value based on a function of the most common value and an inverse of the random number; project the third intermediate value from the mathematical structure to obtain a second output value; and output the second output value.

As another example, an apparatus for secure processing is provided. The apparatus includes means for providing an input value to an algorithm to generate a first output value; means for obtaining a tweak value; means for obtaining a plurality of first intermediate output values, wherein the plurality of first intermediate output values are based on a function of the first output value and the tweak value; means for embedding the plurality of first intermediate output values into a mathematical structure; means for obtaining a plurality of second intermediate output values, wherein the plurality of second intermediate output values are a function of the plurality of first intermediate output values, a random number, and an inverse of the tweak value; means for determining a most common value of the plurality of second intermediate output values; means for obtaining a third intermediate value, the third intermediate value based on a function of the most common value and an inverse of the random number; means for projecting the third intermediate value from the mathematical structure to obtain a second output value; and means for outputting the second output value.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware elements including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
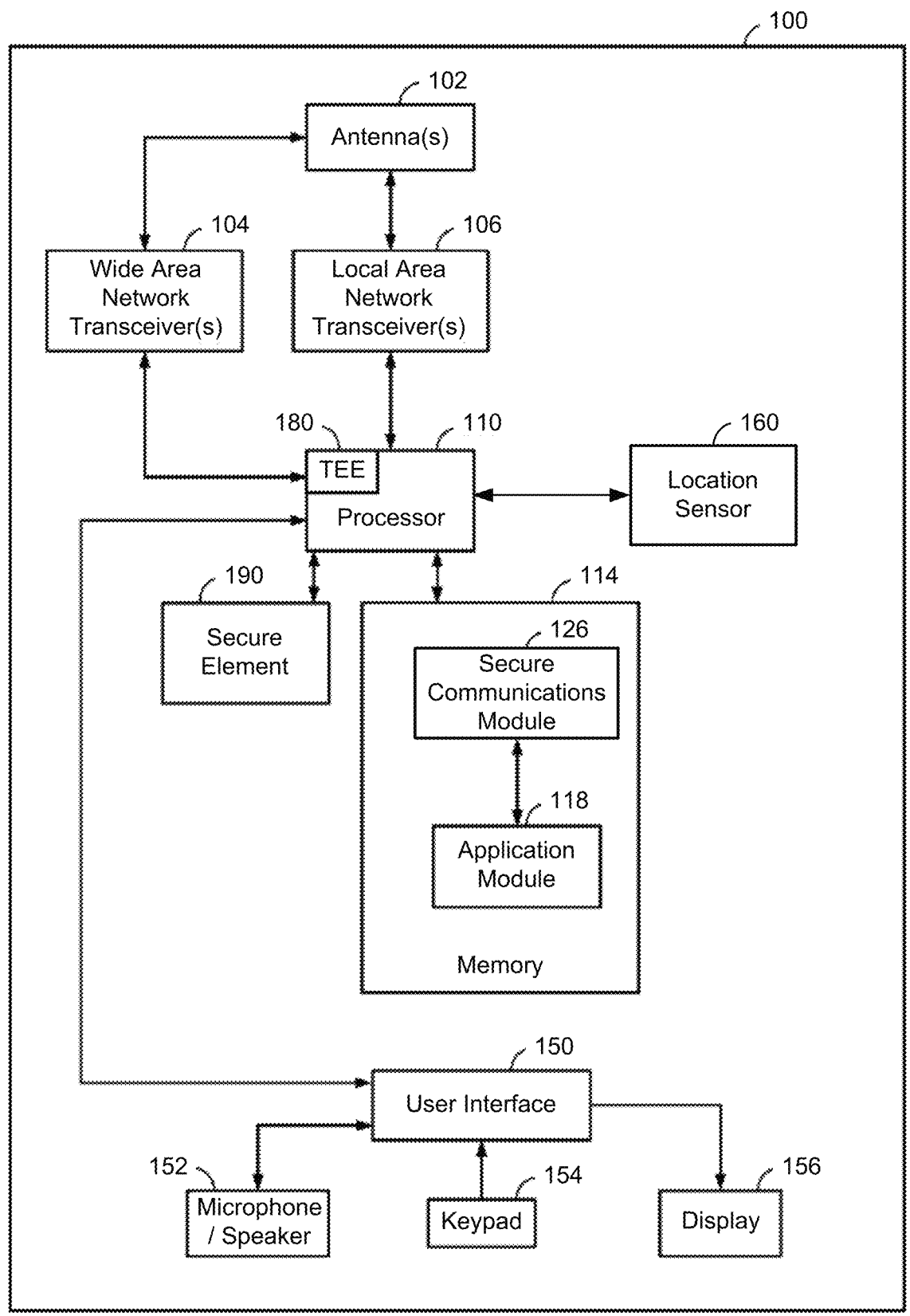
FIG. 1 is a diagram illustrating an example wireless device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a computing device may be capable of performing operations where extra security may be desirable. The computing device can be a wireless device (e.g., a user equipment (UE) in a 3rd Generation Partnership Project (3GPP) system, such as a 4G Long Term Evolution (LTE) network or 5G new radio (NR) network), a base station (e.g., an LTE eNodeB (eNB), a 5G/NR gNodeB (gNB), etc.), a server device, or other computing device. Examples of wireless devices include a mobile device (e.g., a mobile phone), an extended reality (XR) device such as a virtual reality (VR) device or augmented reality (AR) device, a vehicle or component or system of a vehicle, an Internet of Things (IoT) device, a network-connected wearable such as a watch, or other type of computing device.

For example, the computing device may be used to generate private keys which can be used to secure important assets, such as blockchain wallets, digital certificates, digital signatures, and the like. The computing device may also be used to access such important assets. To help allow such security actions to be performed, the computing device may include a secure processing unit. The secure processing unit may be configured or designed (or "hardened") to resist attacks, such as fault injection attacks, which may make the secure processing unit less suitable for general use.

Fault injection attacks are a class of physical attacks where bits may be flipped or forced (e.g., stuck) to a certain value by an attacker. In some cases, fault injection may be used by an attacker in an attempt to gain information about algorithms (e.g., cryptographic algorithms, which may be implemented as circuitry). For example, a fault injection attack may be used to observe how an injected fault can influence an output of an algorithms, or how the injected fault does not change the output of the algorithm. Existing protections against fault injection attacks may not protect against observing how an injected fault does not change an output of an algorithms. Existing protections against fault injection attaches may also use duplicated, but inverse logic to provide such protection, which may be susceptible to side channel attacks.

Systems, apparatuses, electronic devices, methods (also referred to as processes), and computer-readable media (collectively referred to herein as "systems and techniques") are described herein for providing a triplication-based fault attack countermeasure. In some cases, a secure processing unit may execute instructions for and/or include circuitry for performing an algorithm, such as a cryptographic algorithm. For example, the cryptographic algorithm may encrypt data using advanced encryption standard (AES) based on a private key. The algorithm may be modified to accept a first set of tweak values (e.g., a set of three tweak values) and produce a first intermediate output value based on a function of a tweak value and an output value of the algorithm. For example, the output value of the algorithm may be the ordinary output of the algorithm, which may be multiplied by the tweak value to obtain the first intermediate output value. A similar process can be performed for each tweak value of the set of tweak values to generate a respective intermediate output value (e.g., a second intermediate output value for a second tweak value, a third intermediate output value for a third tweak value, etc.).

The intermediate output values may be embedded into a mathematical structure, such as a ring or a field. In some cases, the first intermediate output value may be embedded by expanding the first intermediate output value into a larger field. For example, the first intermediate output value may be expanded from a 32-bit space to a 64-bit space. A function may be applied to the embedded intermediate output values, a random number, and an inverse of the tweak value to obtain a second set of intermediate output values. For instance, the embedded intermediate output values may be multiplied with the random number and the inverse of the tweak value. This may cancel the tweak value.

In some aspects, a most common value of the second set of intermediate output values may be found. An inverse of the random number may be applied to the most common value of the second set of intermediate output values to obtain a third intermediate value. The third intermediate value may then be projected from the mathematical structure to obtain the output value. For example, the third intermediate value may be projected from the mathematical structure by converting the third intermediate value from a 64-bit value to a 32-bit value. The output value may then be output as the output of the algorithm.

Additional aspects of the present disclosure are described in more detail below.

FIG. 1 is a diagram illustrating an example wireless device 100 that can be used to perform the techniques described herein. The wireless device 100 may include a client device such as a user equipment (UE) (e.g., the UE 404, the UE 452, or the UE 490 of FIG. 4 described below) or other type of device (e.g., a station (STA) configured to communication using a Wi-Fi interface) that may be used by an end-user. For example, the wireless device 100 may include a mobile phone, a vehicle or computing system or device of the vehicle, a router, a tablet computer, a laptop computer, a tracking device, a wearable device (e.g., a smart watch, glasses, etc.), an extended reality (XR) device (e.g., a virtual reality (VR), augmented reality (AR), or mixed reality (MR) device, etc.), an Internet of Things (IoT) device, a access point, a point of sale device, and/or another device that is configured to communicate over a wireless communications network.

As shown, the wireless device 100 may include one or more local area network transceivers 106 that may be connected to one or more antennas 102. The one or more local area network transceivers 106 comprise suitable devices, circuits, hardware, and/or software for communicating with and/or detecting signals to/from a network device (e.g., the access point (AP) 450 of FIG. 4), and/or directly with other wireless devices (e.g., the UE 452 of FIG. 4), within a network.

The wireless device 100 may also include, in some implementations, one or more wide area network transceiver(s) 104 that may be connected to the one or more antennas 102. The wide area network transceiver 104 may comprise suitable devices, circuits, hardware, and/or software for communicating with and/or detecting signals from one or more other devices or systems (e.g., the base station (BS) 402, AP 450, millimeter wave (mmW) base station (BS) 480 of FIG. 4) and/or directly with other wireless devices (e.g., UE 452 of FIG. 4) within a network. In some implementations, the wide area network transceiver(s) 104 may comprise a CDMA communication system suitable for communicating with a CDMA network of wireless base stations. In some implementations, the wireless communication system may comprise other types of cellular telephony networks, such as, for example, TDMA, GSM, WCDMA, LTE, NR, and the like. Additionally, any other type of wireless networking technologies may be used, including, for example, WiMax (802.16), Wi-Fi (802.11), and the like.

The processor(s) (also referred to as a controller) 110 may be connected to the local area network transceiver(s) 106 and the wide area network transceiver(s) 104. The processor 110 may include one or more microprocessors, microcontrollers, and/or digital signal processors that provide processing functions, as well as other calculation and control functionality. The processor 110 may be coupled to storage media (e.g., memory) 114 for storing data and software instructions for executing programmed functionality within the mobile device. The memory 114 may be on-board the processor 110 (e.g., within the same IC package), and/or the memory may be external memory to the processor and functionally coupled over a data bus.

In some cases, the processor 110 may be coupled to a location sensor 160. The location sensor 160 may provide information regarding a location of the wireless device 100. In some cases, the location sensor 160 may include a Global Navigation Satellite System (GNSS) receivers or transceivers that are used to determine a location of the wireless device 100. In some cases, the location sensor 160 may estimate a location of the wireless device 100, for example, based on wireless signals received from one or more wireless nodes, such as BS 402, AP 450, mmW BS 480 as shown in FIG. 4.

Figure 4:
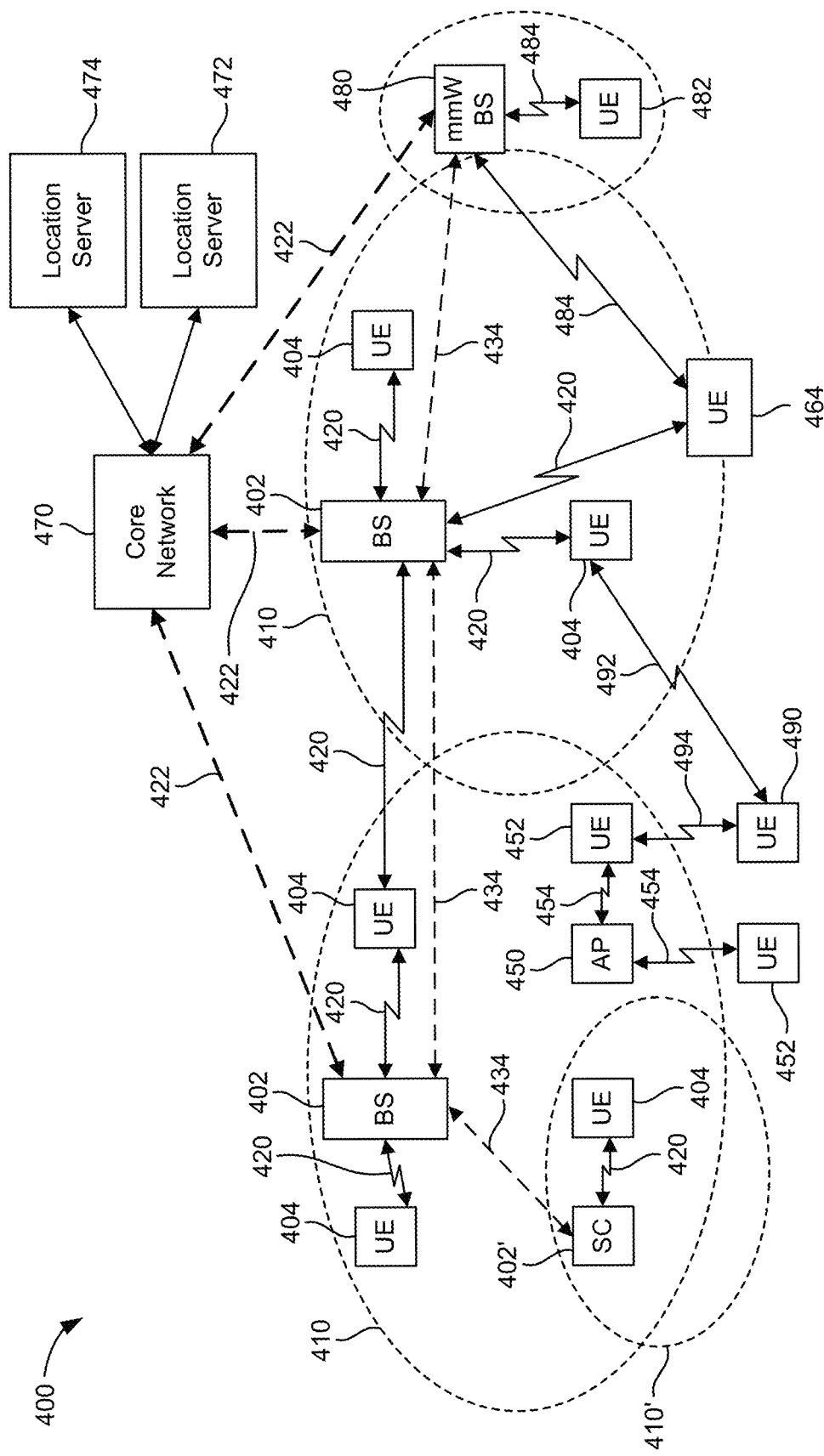
FIG. 4 is a block diagram illustrating an example of a wireless communication network, in accordance with some examples.

A number of software engines and data tables may reside in memory 114 and may be utilized by the processor 110 in order to manage both communications with remote devices/nodes (such as the BS 402, AP 450, mmW BS 480 as shown in FIG. 4), perform positioning determination functionality, and/or perform device control functionality. In some embodiments, the memory 114 may include an application engine 118 and a secure communications engine 126. It is to be noted that the functionality of the modules and/or data structures may be combined, separated, and/or be structured in different ways depending upon the implementation of the wireless device 100.

The application engine 118 may include a process running on the processor 110 of the wireless device 100, which may request data from one of the other modules of the wireless device 100. Applications typically run within an upper layer of the software architectures and may be implemented in a rich execution environment of the wireless device 100, and may include indoor navigation applications, shopping applications, financial services applications, social media applications, location aware service applications, etc. The applications of the application engine 118 may make use of access tokens to obtain content from a remote server, such as location server 474 of FIG. 4.

The secure communications engine 126 may be a process configured to manage the storage of and access to the access tokens, encryption keys, attestation information, and the like. The secure communications engine 126 may be executed on a processor component of the trusted execution environment 180 and/or the secure element 190, where the wireless device 100 includes such components. The functionality of the secure communications engine 126 discussed herein can also be implemented as hardware or a combination of hardware and software. The secure communications engine 126 can be implemented one or more application specific integrated circuits (ASICs), programmable logic devices (PLDs), field programmable gate arrays (FPGAs), or other electronic units designed to perform the functions described herein, or a combination thereof.

The wireless device 100 may further include a user interface 150 providing suitable interface systems, such as a microphone/speaker 152, a keypad 154, and a display 156 that allows user interaction with the wireless device 100. The microphone/speaker 152 provides for voice communication services (e.g., using the wide area network transceiver(s) 104 and/or the local area network transceiver(s) 106). The keypad 154 may comprise suitable buttons for user input. The display 156 may include a suitable display, such as, for example, a backlit LCD display, and may further include a touch screen display for additional user input modes.

The processor 110 may also include a trusted execution environment 180. The trusted execution environment 180 can be implemented as a secure area of the processor 110 that can be used to process and store sensitive data in an environment that is segregated from the rich execution environment in which the operating system and/or applications (such as those of the application engine 118) may be executed. The trusted execution environment 180 can be configured to execute trusted applications that provide end-to-end security for sensitive data by enforcing confidentiality, integrity, and protection of the sensitive data stored therein. The trusted execution environment 180 can be used to store encryption keys, access tokens, and other sensitive data.

The wireless device 100 may include a secure element 190 (also referred to herein as a trusted component). The wireless device 100 may include the secure element 190 in addition to or instead of the trusted execution environment 180. The secure element 190 can comprise autonomous and tamper-resistant hardware that can be used to execute secure applications and the confidential data associated with such applications. The secure element 190 can be used to store encryption keys, access tokens, and other sensitive data. The secure element 190 can comprise a Near Field Communication (NFC) tag, a Subscriber Identity Module (SIM) card, or other type of hardware device that can be used to securely store data. The secure element 190 can be integrated with the hardware of the wireless device 100 in a permanent or semi-permanent fashion or may, in some implementations, be a removable component of the wireless device 100 that can be used to securely store data and/or provide a secure execution environment for applications.

In some cases, the trusted execution environment 180 and/or secure element 190 may be used to execute cryptographic algorithms and/or store data used by cryptographic algorithms, such as private keys. The cryptographic algorithms may use the private keys to encrypt/decrypt sensitive information, such as digital wallets, blockchain wallets, digital signatures, and the like. The operations performed and information used by the cryptographic algorithms may be used to secure high value assets and it may be useful to secure the cryptographic algorithms from physical attacks, such as fault injection attacks, to avoid leaking information, such as the private keys used by the cryptographic algorithm, to an attacker.

Fault injection attacks are a class of physical attacks where bits may be flipped or forced (e.g., stuck) to a certain value by an attacker. In some cases, fault injection may be used by an attacker to gain information about the cryptographic algorithms. Fault injection attacks may be divided into two general types, differential fault attacks or ineffective fault attacks. In a differential fault attack, injected faults may be used to see how the injected fault changes an output of the cryptographic algorithm to infer private information, such as a private key. An ineffective fault attack may use an absence of a difference between an output with and without an injected fault to infer information about the cryptographic algorithm. In some cases, a triplication-based fault attack countermeasure provided by systems and techniques described herein may be used to defeat both differential fault attacks and ineffective fault attacks.

Figure 2:
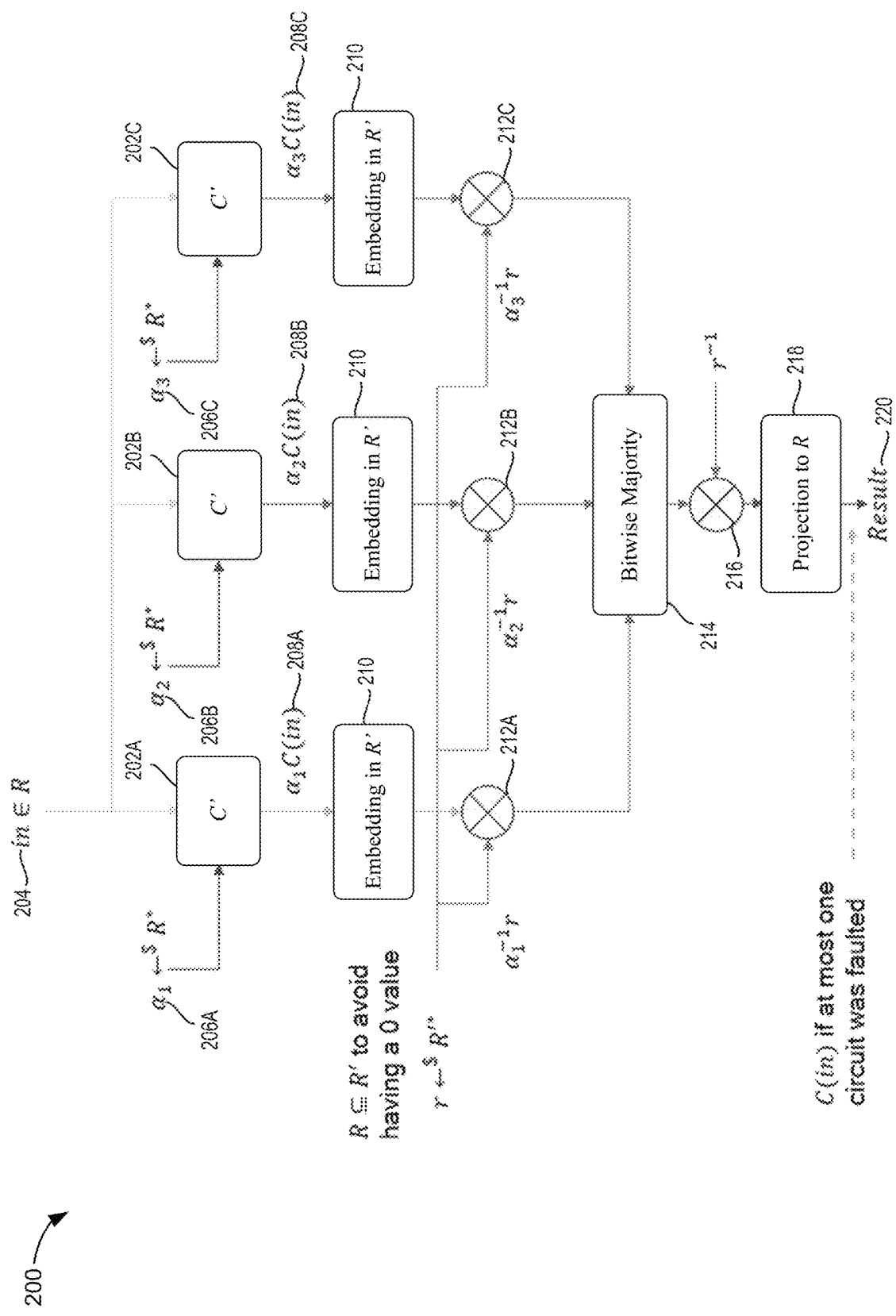
FIG. 2 illustrates an example of a circuit for triplication-based fault attack countermeasure, in accordance with aspects of the present disclosure.

FIG. 2 illustrates a circuit 200 for triplication-based fault attack countermeasure, in accordance with aspects of the present disclosure. Initially, a circuit C may be used to perform an algorithm, such as a cryptographic algorithm. The circuit C (and hence circuit 200) may be implemented in hardware or software and may execute in (and/or be a part of), for example, a secure element 390 and/or TEE 380 of FIG. 3. As an example, the circuit C may be cryptographic accelerator circuit implemented in hardware or software. The circuit C is the circuit being protected by the triplication-based fault attack countermeasure.

The circuit C may be modified into a circuit C' 202 (e.g., circuits C' 202A-202C, collectively). The circuit C' 202 can take as input a tweak value $\alpha \in R^*$ such that, for all input in 204 of the circuit C. C'(in, $\alpha$)=$\alpha$C(in). In circuit 200, three instances (e.g., triplication) of C' may be included (e.g., executed) in the circuit 200, each associated with a tweak value $\alpha_i$. The input in 204 (e.g., the same input) may be input to each of the circuits C' 202.

In some cases, each tweak value may be a different value (e.g., where $a_1 \neq a_2 \neq a_3$). The tweak value may be a random number (e.g., $^{\$}R^*$) that is invertible in ring R. As used herein a random number may also include pseudorandom numbers. An invertible element (e.g., an invertible value) in a ring is a non-zero element (say a), for which there exists another element b such that ab=1 or ba=1 (the ring might not be commutative). As an example, the multiplicative neutral element I_R exists in a ring. The invertible value can be determined by the structure of the ring and should be known by the conceptor of the circuit. For example, with a possible $2^{32}$ values for a 32-bit register as the ring of integers modulo $2^{32}$, the odd elements may be invertible elements. For example, 3*2863311531=1 on a 32-bit architecture. In this example, circuit C' 202A has a tweak value $a_1$ 206A, circuit C' 202B has a tweak value $a_2$ 206B, and circuit C' 202C has a tweak value $a_3$ 206C. Thus, the output of the circuit C' 202 may be expressed as $a_iC(in)$ (e.g., a regular output of the circuit C multiplied by the tweak value). In this example, circuit C' 202A has an intermediate output value $a_1C(in)$ 208A, circuit C' 202B has an intermediate output value $a_2C(in)$ 208B, and circuit C' 202C has an intermediate output value $a_3C(in)$ 208C (collectively, intermediate output values of C' 208).

While circuits C' 202A-202C are shown as parallel circuits in this example, the circuits C' 202A-202C may not necessarily operate in parallel. Further, while circuits C' 202A-202C are shown in FIG. 2 as three separate circuits, there may be fewer or more circuits. For example, circuits C' 202A-202C may be implemented in a serial fashion (either partially or fully), for example as a single circuit C' that is executed multiple times (e.g., 3 times) to obtain multiple intermediate output values of C' 208.

The intermediate output values of C' 208 may be embedded in a mathematical ring R'. The mathematical ring R' includes R, where R⊆R' (to avoid a 0 value). For example, intermediate output value $a_1C(in)$ 208A, intermediate output value $a_2C(in)$ 208B, and intermediate output value $a_3C(in)$ may be embedded ring R' 210. A mathematical ring may be an algebraic structure (e.g., with a set, addition, and multiplication) that may generalize fields. A mathematical ring should satisfy the property of distributivity of the multiplication over addition which can be stated as follows: $a\times(b+c)=a\times b+a\times c$. Fields may be a mathematical structure including a set of numbers and/or operations, such a real numbers, addition, multiplication, etc., and are characterized such that essential arithmetic properties still hold, including the ability to perform a division by any non-zero element. As an example, a field may include a set of integers that may be expressed in 32 binary bits and may include specially crafted multiplication and addition operations so that all requirements for being a field are fulfilled. Another field may include the set of integer that may be expressed in 64 binary bits and may include specially crafted multiplication and addition operations so that all requirements for being a field are fulfilled. In some cases, any ring which is not a field may be used. In some cases, the arithmetic on 32 bits or 64 bits may be implemented as a ring, but not a field, for example with integer arithmetic modulo $2^{(64)}$ . . . . Embedding a value into a ring takes a value which already lies in a ring and defines an operation such that this value will fall into a larger ring. For example, the values 0 and 1 may be encoded on a single bit, and thus they are in a ring {0, 1}. Embedding the value into a larger ring may include adding a leading zero and encoding the values on two bits (e.g., 00 and 01), resulting in the values being in a larger ring {00, 01, 10, 11}. In some cases, arbitrary data values may be embedded into a ring by coding the data values so the data values appear as elements of the ring.

In some cases, the intermediate output values of C' 208 may be embedded into binary fields $\mathbb{F}_{2^q}$. In some cases, embedding into R' is done so that the $\alpha_iC(in)$ are not 0. For example, if $C(in)=0$, then C' $(in, \alpha_i)=0$ and the subsequent multiplication by r may not randomize the value by expanding into the ring R'. As an example of embedding an intermediate output value $a_iC(in)$ in a ring R', the intermediate output value $a_iC(in)$ may be expanded into a different, larger set of numbers, such as by expanding a 32-bit intermediate output value $a_iC(in)$ to a 64-bit space.

The embedded intermediate output values of the circuits C' may be multiplied by a non-zero, random, and invertible value r along with an inverse of the tweak value $\alpha_i^{-1}$. For example, at a first multiplier 212A, the embedded intermediate output value $a_1C(in)$ 208A may be multiplied by $\alpha_1^{-1}r$. At a second multiplier 212B, the embedded intermediate output value $a_2C(in)$ 208B may be multiplied by $\alpha_2^{-1}r$. At a third multiplier 212C, embedded intermediate output value $a_3C(in)$ 208C may be multiplied by $\alpha_3^{-1}r$. A second intermediate output from the first multiplier 212A, second multiplier 212B, and third multiplier 212C may be passed to a bitwise majority function 214.

The bitwise majority function 214 determines the most common value of the outputs of the first multiplier 212A, second multiplier 212B, and third multiplier 212C. For example, if there is zero or one fault in the above discussed portion of circuit 200, the output of the bitwise majority function 214 (e.g., third intermediate output) should be $rC(in)$ (e.g., the expected output of circuit C multiplied by r), embedded in ring R'. The third intermediate output of the bitwise majority function 214 may then be multiplied, at multiplier 216, by an inverse of r, $r^{-1}$ to obtain $C(in)$ embedded in ring R'. The expansion to ring R' may be removed by projecting 218 ring R' back to ring R to obtain a final result $C(in)$ 220. For example, where the intermediate output values of C' 208 was embedded in ring R' by expanding the intermediate output values of C' 208 from a smaller bit space (e.g., 32 bit of ring R) to a larger bit space, projecting 218 the ring R' to R to may be performed by converting (e.g., projecting) $C(in)$ from the 64-bit space (e.g., of ring R') into 32-bit space (e.g., of ring R) to obtain $C(in)$ in the 32-bit space.

As shown in circuit 200, if a single fault is injected into one of the three C' circuits 202, the final result $C(in)$ 220 may still be obtained. If multiple faults are injected, then a random value may be obtained. As, the final result $C(in)$ 220 may be encrypted data, such as ciphertext, results of a hash function, and the like, or a random value, the output may not be manipulated, for example, by injecting various faults, to learn information about the operations of the circuits C/C'. Further, to counter ineffective fault attacks, any errors caused by induced faults may be propagated throughout the computation of circuit 200 without altering how the computation operates.

In some cases, if $\alpha_i=1_R$, then C and C' may be functionally the same circuits, however, there could be an increase chance of side-channel leakage.

Figure 3:
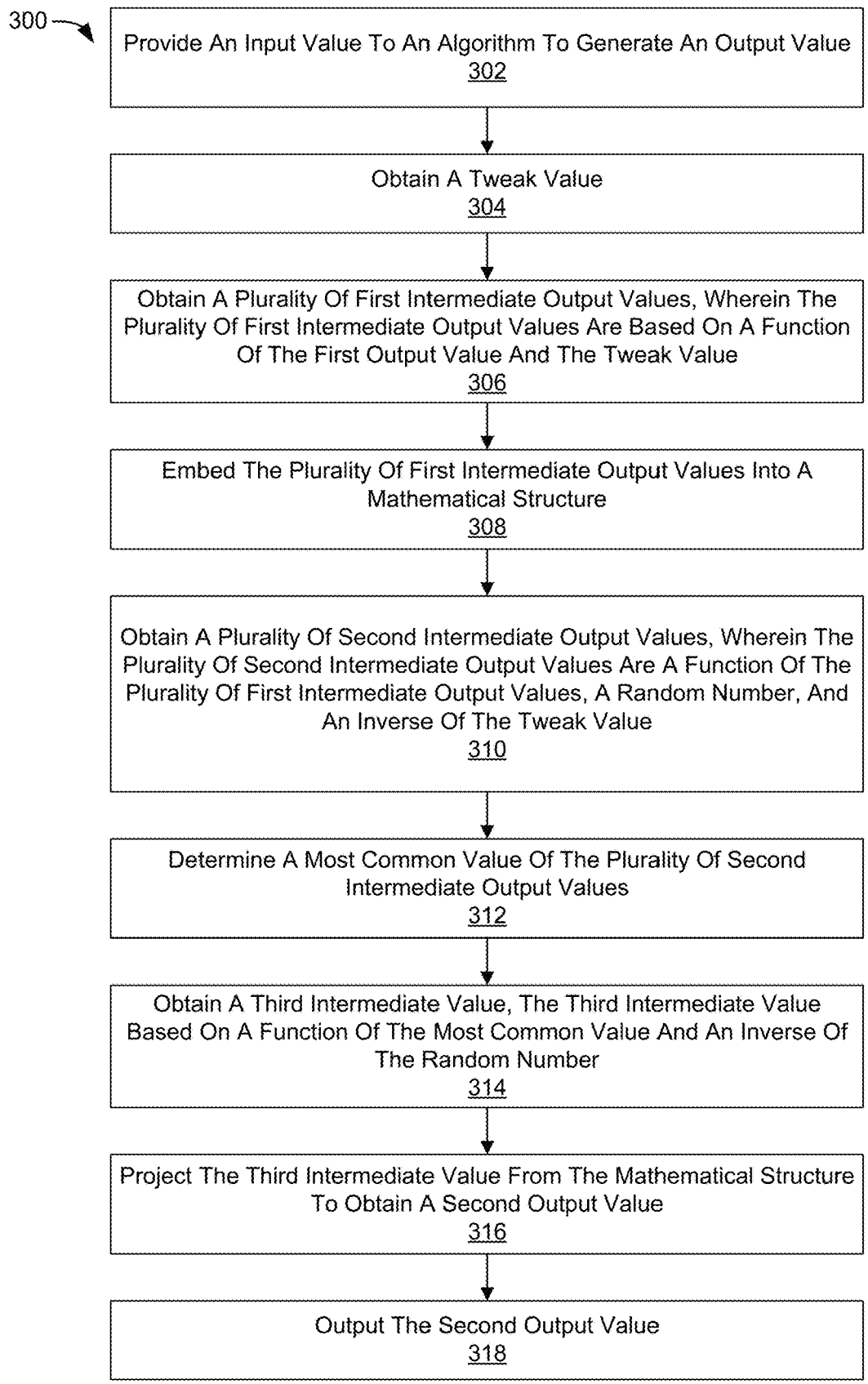
FIG. 3 is a flow diagram of a process for secure processing, in accordance with aspects of the present disclosure.

FIG. 3 is a flow diagram of a process 300 for secure processing, in accordance with aspects of the present disclosure. The process 300 may be performed by a computing device (or apparatus) or a component (e.g., a chipset, codec, processor 110 of FIG. 1, secure element 190 of FIG. 1, processor 610 of FIG. 6, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 300 may be implemented as software components that are executed and run on one or more processors and/or processor systems. In some cases, the processor system includes a hardware circuit configured to generate the second output value from the first output value.

At block 302, the computing device (or component thereof) may provide an input value (e.g., a input into an algorithm or circuit as discussed above with respect to FIG. 2) to an algorithm (e.g., as implemented in circuit C as discussed above with respect to FIG. 2) to generate a first output value (e.g., input in 204 of FIG. 2). In some cases, the algorithm comprises a cryptographic algorithm.

At block 304, the computing device (or component thereof) may obtain a tweak value (e.g., tweak values 206A-206C of FIG. 2). In some cases, the tweak value comprises a random, non-zero value.

At block 306, the computing device (or component thereof) may obtain a plurality of first intermediate output values (e.g., intermediate output values 208A-208C of FIG. 2), wherein the plurality of first intermediate output values are based on a function of the first output value and the tweak value. In some cases, each first intermediate output value, of the plurality of first intermediate output values, is based on a separate tweak value (e.g., tweak value $a_1$ 206A, tweak value $a_2$ 206B, and tweak value $a_3$ 206C of FIG. 2) wherein each separate tweak value is a different value. In some cases, the plurality of first intermediate output values are obtained substantially in parallel.

At block 308, the computing device (or component thereof) may embed the plurality of first intermediate output values into a mathematical structure (e.g., mathematical ring R'). In some cases, the mathematical structure comprises a field, wherein the field comprises a set of integers expressed in a number of binary bits. In some cases, the computing device (or component thereof) embeds the plurality of first intermediate output values into a mathematical structure by expanding the plurality of first intermediate output values from a first bit space (e.g., a 32-bit space) into a second bit space (e.g., a 64-bit space) that is larger than the first bit space.

At block 310, the computing device (or component thereof) may obtain a plurality of second intermediate output values (e.g., embedded intermediate output values of C' as discussed above with respect to FIG. 2), wherein the plurality of second intermediate output values are a function of the plurality of first intermediate output values, a random number, and an inverse of the tweak value (e.g., $\alpha_i^{-1}$ ad discussed above with respect to FIG. 2). In some cases, each second intermediate output value, of the plurality of second intermediate output values, corresponds with a first intermediate output value and wherein each second intermediate output value is based on an inverse of the separate tweak value (e.g., $\alpha_1^{-1}$, $\alpha_2^{-1}$, and $\alpha_3^{-1}$ of FIG. 2) of the corresponding first intermediate output value.

At block 312, the computing device (or component thereof) may determine a most common value (e.g., by bitwise majority function 214 of FIG. 2) of the plurality of second intermediate output values.

At block 314, the computing device (or component thereof) may obtain a third intermediate value, the third intermediate value based on a function of the most common value and an inverse of the random number (e.g., an output of multiplier 216 of FIG. 2).

At block 316, the computing device (or component thereof) may project (e.g., projecting 218 of FIG. 2) the third intermediate value from the mathematical structure to obtain a second output value (e.g., final result 220 of FIG. 2). In some cases, the computing device (or component thereof) may project the third intermediate value from the mathematical structure by converting the third intermediate value from a second bit space to a first bit space.

At block 318, the computing device (or component thereof) may output the second output value. In some cases, the second output value is equal to the first output value (e.g., where there are no faults, or if less that a majority of the second intermediate output values are faulted). In some cases, the second output value comprises a random value (e.g., if a majority of the second intermediate output values are faulted or if multiplier 216 and/or projecting 218 of FIG. 2 are faulted).

As described herein, a wireless device (e.g., the wireless device 100 of FIG. 1) can communicate via one or more wireless networks. Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, etc.), an XR device (e.g., a VR headset, an AR headset or glasses, or a MR headset), a vehicle (e.g., automobile, motorcycle, bicycle, etc.), and/or IoT device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 4 illustrates an example of a wireless communications system 400 that can provide a wireless device (e.g., the wireless device 100 of FIG. 1) with network access. The wireless communications system 400 (which may also be referred to as a wireless wide area network (WWAN)) may include various base stations 402 and various UEs 404. The wireless device 100 of FIG. 1 is an example of a UE 404. In some aspects, the base stations 402 may also be referred to as "network entities" or "network nodes." One or more of the base stations 402 may be implemented in an aggregated or monolithic base station architecture. Additionally, or alternatively, one or more of the base stations 402 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 402 may include macro cell base stations (high power cellular base stations) and/or small cell base stations (low power cellular base stations). In an aspect, the macro cell base station may include eNBs and/or ng-eNBs where the wireless communications system 400 corresponds to a long term evolution (LTE) network, or gNBs where the wireless communications system 400 corresponds to a NR network, or a combination of both, and the small cell base stations may include femtocells, picocells, microcells, etc.

The base stations 402 may collectively form a RAN and interface with a core network 470 (e.g., an evolved packet core (EPC) or a 5G core (5GC)) through backhaul links 422, and through the core network 470 to one or more location servers 472 (which may be part of core network 470 or may be external to core network 470). The UEs 404 may be able to access one or more remote servers 474 via the base stations 402 and core network 470, and in some cases, the other networks, such as the Internet. In addition to other functions, the base stations 402 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 402 may communicate with each other directly or indirectly (e.g., through the EPC or 5GC) over backhaul links 434, which may be wired and/or wireless.

The base stations 402 may wirelessly communicate with the UEs 404. Each of the base stations 402 may provide communication coverage for a respective geographic coverage area 410. In an aspect, one or more cells may be supported by a base station 402 in each coverage area 410. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 410.

While neighboring macro cell base station 402 geographic coverage areas 410 may partially overlap (e.g., in a handover region), some of the geographic coverage areas 410 may be substantially overlapped by a larger geographic coverage area 410. For example, a small cell base station 402' may have a coverage area 410' that substantially overlaps with the coverage area 410 of one or more macro cell base stations 402. A network that includes both small cell and macro cell base stations may be known as a heterogeneous network. A heterogeneous network may also include home eNBs (HeNBs), which may provide service to a restricted group known as a closed subscriber group (CSG).

The communication links 420 between the base stations 402 and the UEs 404 may include uplink (also referred to as reverse link) transmissions from a UE 404 to a base station 402 and/or downlink (also referred to as forward link) transmissions from a base station 402 to a UE 404. The communication links 420 may use MIMO antenna technology, including spatial multiplexing, beamforming, and/or transmit diversity. The communication links 420 may be through one or more carrier frequencies. Allocation of carriers may be asymmetric with respect to downlink and uplink (e.g., more or less carriers may be allocated for downlink than for uplink).

The wireless communications system 400 may further include a WLAN AP 450 in communication with WLAN stations (STAs) 452 via communication links 454 in an unlicensed frequency spectrum (e.g., 5 Gigahertz (GHz)). When communicating in an unlicensed frequency spectrum, the WLAN STAs 452 and/or the WLAN AP 450 may perform a clear channel assessment (CCA) or listen before talk (LBT) procedure prior to communicating in order to determine whether the channel is available. In some examples, the wireless communications system 400 may include devices (e.g., UEs, etc.) that communicate with one or more UEs 404, base stations 402, APs 450, etc. utilizing the ultra-wideband (UWB) spectrum. The UWB spectrum may range from 3.1 to 10.5 GHZ.

The small cell base station 402' may operate in a licensed and/or an unlicensed frequency spectrum. When operating in an unlicensed frequency spectrum, the small cell base station 402' may employ LTE or NR technology and use the same 5 GHz unlicensed frequency spectrum as used by the WLAN AP 450. The small cell base station 402', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 400 may further include a millimeter wave (mmW) base station 480 that may operate in mmW frequencies and/or near mmW frequencies in communication with a UE 482. The mmW base station 480 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW and/or near mmW radio frequency band have high path loss and a relatively short range. The mmW base station 480 and the UE 482 may utilize beamforming (transmit and/or receive) over an mmW communication link 484 to compensate for the extremely high path loss and short range. Further, it will be appreciated that in alternative configurations, one or more base stations 402 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 402/480, UEs 404/482) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 404/482 and the cell in which the UE 404/482 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 404 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 404/482 in a cell may have different downlink primary carriers. The same is true for the uplink primary carriers. The network is able to change the primary carrier of any UE 404/482 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 4, one of the frequencies utilized by the macro cell base stations 402 may be an anchor carrier (or "PCell") and other frequencies utilized by the macro cell base stations 402 and/or the mmW base station 480 may be secondary carriers ("SCells"). In carrier aggregation, the base stations 402 and/or the UEs 404 may use spectrum up to Y MHZ (e.g., 5, 10, 15, 20, 100 MHZ) bandwidth per carrier up to a total of Yx MHZ (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 404/482 to significantly increase its data transmission and/or reception rates. For example, two 20 MHZ aggregated carriers in a multi-carrier system would theoretically lead to a two-fold increase in data rate (i.e., 40 MHZ), compared to that attained by a single 20 MHz carrier.

In order to operate on multiple carrier frequencies, a base station 402 and/or a UE 404 may be equipped with multiple receivers and/or transmitters. For example, a UE 404 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 404 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 404 is being served in band 'X' or band 'Y,' because of the separate "Receiver 2," the UE 404 may measure band 'Z' without interrupting the service on band 'X' or band 'Y.'

The wireless communications system 400 may further include a UE 464 that may communicate with a macro cell base station 402 over a communication link 420 and/or the mmW base station 480 over an mmW communication link 484. For example, the macro cell base station 402 may support a PCell and one or more SCells for the UE 464 and the mmW base station 480 may support one or more SCells for the UE 464.

The wireless communications system 400 may further include one or more UEs, such as UE 490, that connects indirectly to one or more communication networks via one or more device-to-device (D2D) peer-to-peer (P2P) links (referred to as "sidelinks"). In the example of FIG. 4, UE 490 has a D2D P2P link 492 with one of the UEs 404 connected to one of the base stations 402 (e.g., through which UE 490 may indirectly obtain cellular connectivity) and a D2D P2P link 494 with WLAN STA 452 connected to the WLAN AP 450 (through which UE 490 may indirectly obtain WLAN-based Internet connectivity). In an example, the D2D P2P links 492 and 494 may be supported with any well-known D2D RAT, such as LTE Direct (LTE-D), Wi-Fi Direct (Wi-Fi-D), Bluetooth®, and so on.

Figure 5:
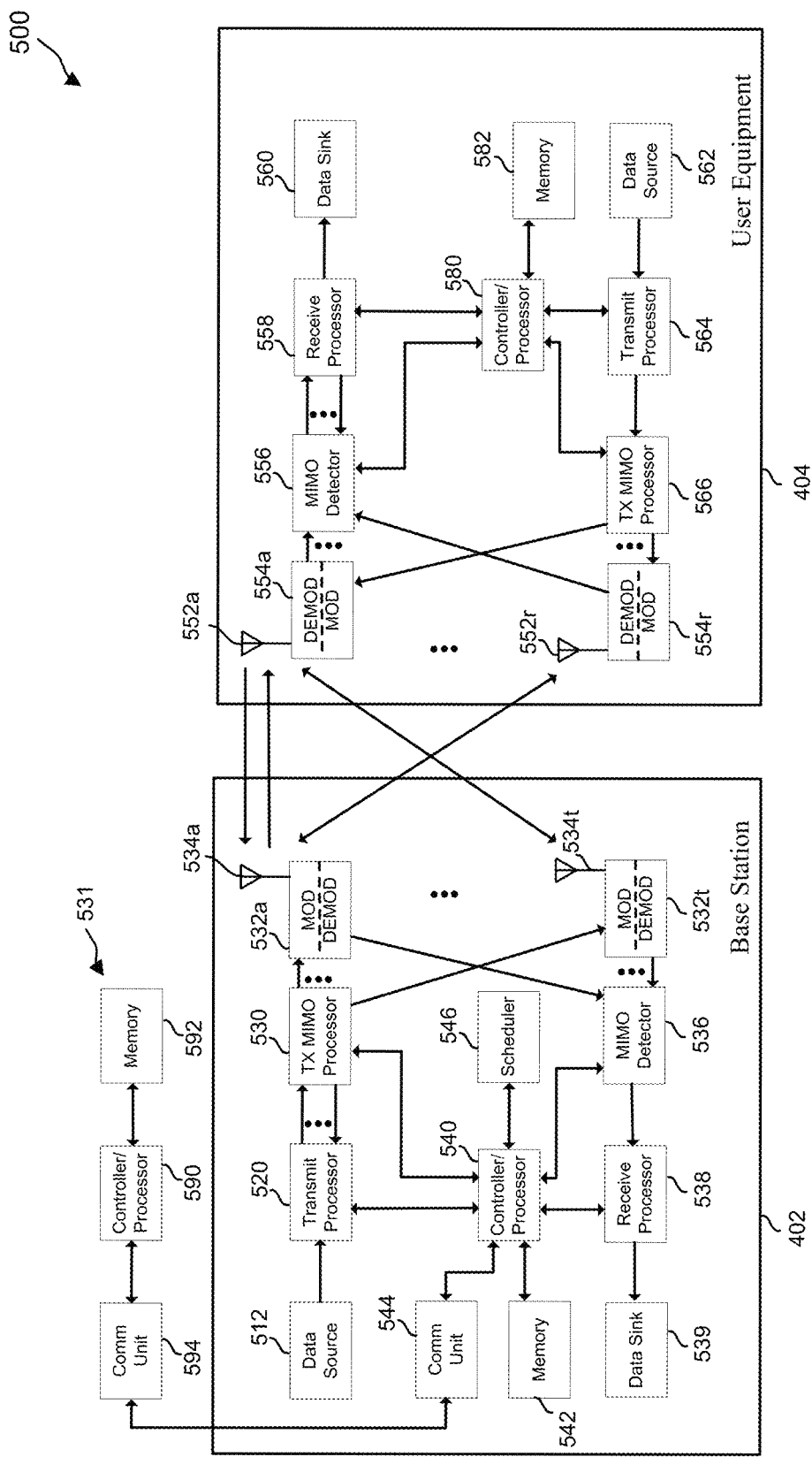
FIG. 5 is a diagram illustrating a design of a base station and a User Equipment (UE) device that enable transmission and processing of signals exchanged between the UE and the base station, in accordance with some examples.

FIG. 5 shows a block diagram of a design of a base station 406 and a UE 404 that enable transmission and processing of signals exchanged between the UE and the base station, in accordance with some aspects of the present disclosure. Design 500 includes components of a base station 402 and a UE 404, which may be one of the base stations 402 and one of the UEs 404 in FIG. 4. Base station 402 may be equipped with T antennas 534a through 534t, and UE 404 may be equipped with R antennas 552a through 552r, where in general T≥1 and R≥1.

At base station 402, a transmit processor 520 may receive data from a data source 512 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 520 may also process system information (e.g., for semi-static resource partitioning information (SRPI) and/or the like) and control information (e.g., CQI requests, grants, upper layer signaling, and/or the like) and provide overhead symbols and control symbols. Transmit processor 520 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 530 may perform spatial processing (e.g., precoding) on the data symbols, the control symbols, the overhead symbols, and/or the reference symbols, if applicable, and may provide T output symbol streams to T modulators (MODs) 532a through 532t. The modulators 532a through 532t are shown as a combined modulator-demodulator (MOD-DEMOD). In some cases, the modulators and demodulators may be separate components. Each modulator of the modulators 532a to 532t may process a respective output symbol stream, e.g., for an orthogonal frequency-division multiplexing (OFDM) scheme and/or the like, to obtain an output sample stream. Each modulator of the modulators 532a to 532t may further process (e.g., convert to analog, amplify, filter, and upconvert) the output sample stream to obtain a downlink signal. T downlink signals may be transmitted from modulators 532a to 532t via T antennas 534a through 534t, respectively. According to certain aspects described in more detail below, the synchronization signals may be generated with location encoding to convey additional information.

At UE 404, antennas 552a through 552r may receive the downlink signals from base station 502 and/or other base stations and may provide received signals to demodulators (DEMODs) 554a through 554r, respectively. The demodulators 554a through 554r are shown as a combined modulator-demodulator (MOD-DEMOD). In some cases, the modulators and demodulators may be separate components. Each demodulator of the demodulators 554a through 554r may condition (e.g., filter, amplify, downconvert, and digitize) a received signal to obtain input samples. Each demodulator of the demodulators 554a through 554r may further process the input samples (e.g., for OFDM and/or the like) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate and decode) the detected symbols, provide decoded data for UE 404 to a data sink 560, and provide decoded control information and system information to a controller/processor 580. A channel processor may determine reference signal received power (RSRP), received signal strength indicator (RSSI), reference signal received quality (RSRQ), channel quality indicator (CQI), and/or the like.

On the uplink, at UE 404, a transmit processor 564 may receive and process data from a data source 562 and control information (e.g., for reports comprising RSRP, RSSI, RSRQ, CQI, and/or the like) from controller/processor 580. Transmit processor 564 may also generate reference symbols for one or more reference signals (e.g., based at least in part on a beta value or a set of beta values associated with the one or more reference signals). The symbols from transmit processor 564 may be precoded by a TX-MIMO processor 566 if application, further processed by modulators 554*a* through 554*r* (e.g., for DFT-s-OFDM, CP-OFDM, and/or the like), and transmitted to base station 402. At base station 402, the uplink signals from UE 404 and other UEs may be received by antennas 534*a* through 534*t*, processed by demodulators 532*a* through 532*t*, detected by a MIMO detector 536 if applicable, and further processed by a receive processor 538 to obtain decoded data and control information sent by UE 404. Receive processor 538 may provide the decoded data to a data sink 539 and the decoded control information to controller (processor) 540. Base station 402 may include communication unit 544 and communicate to a network controller 531 via communication unit 544. Network controller 531 may include communication unit 594, controller/processor 590, and memory 592.

In some aspects, one or more components of UE 404 may be included in a housing. Controller 540 of base station 402, controller/processor 580 of UE 404, and/or any other component(s) of FIG. 5 may perform one or more techniques associated with implicit UCI beta value determination for NR.

Memories 542 and 582 may store data and program codes for the base station 402 and the UE 404, respectively. A scheduler 546 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

In some examples, the processes described herein (e.g., process 300 and/or other process described herein) may be performed by a computing device or apparatus (e.g., a UE or a base station). In another example, the process 300 may be performed by the UE 404 of FIG. 4. In another example, the process 300 may be performed by a computing device with the computing system 600 shown in FIG. 6.

Figure 6:
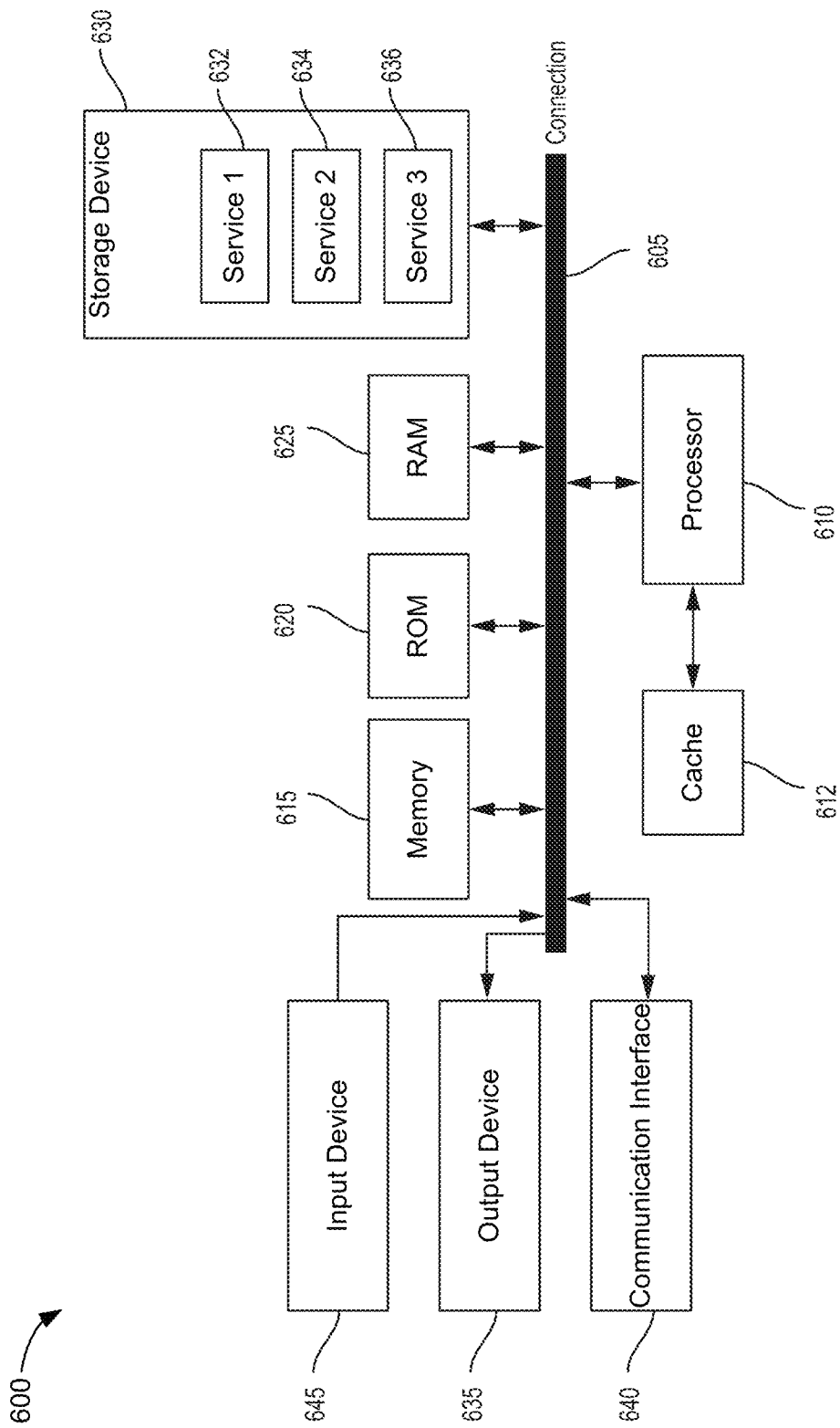
FIG. 6 is a diagram illustrating an example of a computing system, according to aspects of the disclosure.

FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a signal connection into processor 610, such as in a chipset architecture. Connection 605 may also be a virtual connection, networked connection, or logical connection.

In some embodiments, computing system 600 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 600 includes at least one processing unit (CPU or processor) 610 and connection 605 that communicatively couples various system components including system memory 615, such as read-only memory (ROM) 620 and random access memory (RAM) 625 to processor 610. Computing system 600 may include a cache 612 of high-speed memory connected directly with, in close proximity to, or integrated as part of processor 610.

Processor 610 may include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/ plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be one or more non-volatile and/or non-transitory and/or computer-readable memory devices and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, it causes the system to perform a function. In some embodiments, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for secure processing, comprising: a memory system comprising instructions; and a processor system coupled to the memory system, wherein the processor system is configured to: provide an input value to an algorithm to generate a first output value; obtain a tweak value; obtain a plurality of first intermediate output values, wherein the plurality of first intermediate output values are based on a function of the first output value and the tweak value; embed the plurality of first intermediate output values into a mathematical structure; obtain a plurality of second intermediate output values, wherein the plurality of second intermediate output values are a function of the plurality of first intermediate output values, a random number, and an inverse of the tweak value; determine a most common value of the plurality of second intermediate output values; obtain a third intermediate value, the third intermediate value based on a function of the most common value and an inverse of the random number; project the third intermediate value from the mathematical structure to obtain a second output value; and output the second output value.

Aspect 2. The apparatus of Aspect 1, wherein the mathematical structure comprises a field, wherein the field comprises a set of integers expressed in a number of binary bits, and wherein, to embed the plurality of first intermediate output values into a mathematical structure, the processor system is configured to expand the plurality of first intermediate output values from a first bit space into a second bit space that is larger than the first bit space.

Aspect 3. The apparatus of any of Aspects 1-2, wherein, to project the third intermediate value from the mathematical structure, the processor system is configured to convert the third intermediate value from a second bit space to a first bit space.

Aspect 4. The apparatus of any of Aspects 1-3, wherein the tweak value comprises a random, non-zero value.

Aspect 5. The apparatus of any of Aspects 1-4, wherein each first intermediate output value, of the plurality of first intermediate output values, is based on a separate tweak value wherein each separate tweak value is a different value.

Aspect 6. The apparatus of Aspect 5, wherein each second intermediate output value, of the plurality of second intermediate output values, corresponds with a first intermediate output value and wherein each second intermediate output value is based on an inverse of the separate tweak value of the corresponding first intermediate output value.

Aspect 7. The apparatus of any of Aspects 1-6, wherein the algorithm comprises a cryptographic algorithm.

Aspect 8. The apparatus of any of Aspects 1-7, wherein the plurality of first intermediate output values are obtained substantially in parallel.

Aspect 9. The apparatus of any of Aspects 1-8, wherein the second output value is equal to the first output value.

Aspect 10. The apparatus of any of Aspects 1-9, wherein the second output value comprises a random value.

Aspect 11. The apparatus of any of Aspects 1-10, wherein the processor system includes a hardware circuit configured to generate the second output value from the first output value.

Aspect 12. A method for secure processing, comprising: providing an input value to an algorithm to generate a first output value; obtaining a tweak value; obtaining a plurality of first intermediate output values, wherein the plurality of first intermediate output values are based on a function of the first output value and the tweak value; embedding the plurality of first intermediate output values into a mathematical structure; obtaining a plurality of second intermediate output values, wherein the plurality of second intermediate output values are a function of the plurality of first intermediate output values, a random number, and an inverse of the tweak value; determining a most common value of the plurality of second intermediate output values; obtaining a third intermediate value, the third intermediate value based on a function of the most common value and an inverse of the random number; projecting the third intermediate value from the mathematical structure to obtain a second output value; and outputting the second output value.

Aspect 13. The method of Aspect 12, wherein the mathematical structure comprises a field, wherein the field comprises a set of integers expressed in a number of binary bits, and wherein embedding the plurality of first intermediate output values into a mathematical structure comprises expanding the plurality of first intermediate output values from a first bit space into a second bit space that is larger than the first bit space.

Aspect 14. The method of any of Aspects 12-13, wherein projecting the third intermediate value from the mathematical structure comprises converting the third intermediate value from a second bit space to a first bit space.

Aspect 15. The method of any of Aspects 12-14, wherein the tweak value comprises a random, non-zero value.

Aspect 16. The method of any of Aspects 12-15, wherein each first intermediate output value, of the plurality of first intermediate output values, is based on a separate tweak value wherein each separate tweak value is a different value.

Aspect 17. The method of Aspect 16, wherein each second intermediate output value, of the plurality of second intermediate output values, corresponds with a first intermediate output value and wherein each second intermediate output value is based on an inverse of the separate tweak value of the corresponding first intermediate output value.

Aspect 18. The method of any of Aspects 12-17, wherein the algorithm comprises a cryptographic algorithm.

Aspect 19. The method of any of Aspects 12-18, wherein the plurality of first intermediate output values are obtained substantially in parallel.

Aspect 20. The method of any of Aspects 12-19, wherein the second output value is equal to the first output value.

Aspect 21. The method of any of Aspects 12-20, wherein the second output value comprises a random value.

Aspect 22. A non-transitory computer-readable medium having stored thereon instructions that, when executed by a processor system, cause the processor system to: provide an input value to an algorithm to generate a first output value; obtain a tweak value; obtain a plurality of first intermediate output values, wherein the plurality of first intermediate output values are based on a function of the first output value and the tweak value; embed the plurality of first intermediate output values into a mathematical structure; obtain a plurality of second intermediate output values, wherein the plurality of second intermediate output values are a function of the plurality of first intermediate output values, a random number, and an inverse of the tweak value; determine a most common value of the plurality of second intermediate output values; obtain a third intermediate value, the third intermediate value based on a function of the most common value and an inverse of the random number; project the third intermediate value from the mathematical structure to obtain a second output value; and output the second output value.

Aspect 23. The non-transitory computer-readable medium of Aspect 22, wherein the mathematical structure comprises a field, wherein the field comprises a set of integers expressed in a number of binary bits, and wherein, to embed the plurality of first intermediate output values into a mathematical structure, the instructions cause the processor system to expand the plurality of first intermediate output values from a first bit space into a second bit space that is larger than the first bit space.

Aspect 24. The non-transitory computer-readable medium of any of Aspects 22-23, wherein, to project the third intermediate value from the mathematical structure, the instructions cause the processor system configured to convert the third intermediate value from a second bit space to a first bit space.

Aspect 25. The non-transitory computer-readable medium of any of Aspects 22-24 wherein the tweak value comprises a random, non-zero value.

Aspect 26. The non-transitory computer-readable medium of any of Aspects 22-25, wherein each first intermediate output value, of the plurality of first intermediate output values, is based on a separate tweak value wherein each separate tweak value is a different value.

Aspect 27. The non-transitory computer-readable medium of Aspect 26, wherein each second intermediate output value, of the plurality of second intermediate output values, corresponds with a first intermediate output value and wherein each second intermediate output value is based on an inverse of the separate tweak value of the corresponding first intermediate output value.

Aspect 28. The non-transitory computer-readable medium of any of Aspects 22-27, wherein the algorithm comprises a cryptographic algorithm.

Aspect 29. The non-transitory computer-readable medium of any of Aspects 22-28, wherein the plurality of first intermediate output values are obtained substantially in parallel.

Aspect 30. The non-transitory computer-readable medium of any of Aspects 22-29, wherein the second output value is equal to the first output value.

Aspect 31. The non-transitory computer-readable medium of any of Aspects 22-30, wherein the second output value comprises a random value.

Aspect 32. An apparatus for secure processing, comprising one or more means for performing operations according to any of Aspects 12-21.

What is claimed is:

1. An apparatus for secure processing, comprising:
a memory system comprising instructions; and
a processor system coupled to the memory system, wherein the processor system is configured to:
provide an input value to a circuit that generates a first output value;
obtain a tweak value;
obtain a plurality of first intermediate output values, wherein the plurality of first intermediate output values are generated by the circuit based on a function of the input value and the tweak value;
embed the plurality of first intermediate output values into a structure;
obtain a plurality of second intermediate output values, wherein the plurality of second intermediate output values are a function of the plurality of first intermediate output values, a random number, and an inverse of the tweak value;
determine a most common value of the plurality of second intermediate output values, wherein the most common value represents a fault injection resistant value or a random value;
obtain a third intermediate value, the third intermediate value based on a function of the most common value and an inverse of the random number;
project the third intermediate value from the structure to obtain a second output value; and
output the second output value.

2. The apparatus of claim 1, wherein the structure comprises a field, wherein the field comprises a set of integers expressed in a number of binary bits, and wherein, to embed the plurality of first intermediate output values into the structure, the processor system is configured to expand the plurality of first intermediate output values from a first bit space into a second bit space that is larger than the first bit space.

3. The apparatus of claim 1, wherein, to project the third intermediate value from the structure, the processor system is configured to convert the third intermediate value from a second bit space to a first bit space.

4. The apparatus of claim 1, wherein the tweak value comprises a random, non-zero value.

5. The apparatus of claim 1, wherein each first intermediate output value, of the plurality of first intermediate output values, is based on a separate tweak value wherein each separate tweak value is a different value.

6. The apparatus of claim 5, wherein each second intermediate output value, of the plurality of second intermediate output values, corresponds with a first intermediate output value and wherein each second intermediate output value is based on an inverse of the separate tweak value of the corresponding first intermediate output value.

7. The apparatus of claim 1, wherein the circuit is configured to perform a cryptographic algorithm.

8. The apparatus of claim 1, wherein the plurality of first intermediate output values are obtained substantially in parallel.

9. The apparatus of claim 1, wherein the second output value is equal to the first output value.

10. The apparatus of claim 1, wherein the second output value comprises a random value.

11. The apparatus of claim 1, wherein the processor system includes a hardware circuit configured to generate the second output value from the first output value.

12. A method for secure processing, comprising:
provide an input value to a circuit that generates a first output value;
obtaining a tweak value;
obtaining a plurality of first intermediate output values, wherein the plurality of first intermediate output values are generated by the circuit based on a function of the input value and the tweak value;
embedding the plurality of first intermediate output values into a structure;
obtaining a plurality of second intermediate output values, wherein the plurality of second intermediate output values are a function of the plurality of first intermediate output values, a random number, and an inverse of the tweak value;
determining a most common value of the plurality of second intermediate output values, wherein the most common value represents a fault injection resistant value or a random value;
obtaining a third intermediate value, the third intermediate value based on a function of the most common value and an inverse of the random number;
projecting the third intermediate value from the structure to obtain a second output value; and
outputting the second output value.

13. The method of claim 12, wherein the structure comprises a field, wherein the field comprises a set of integers expressed in a number of binary bits, and wherein embedding the plurality of first intermediate output values into the structure comprises expanding the plurality of first intermediate output values from a first bit space into a second bit space that is larger than the first bit space.

14. The method of claim 12, wherein projecting the third intermediate value from the structure comprises converting the third intermediate value from a second bit space to a first bit space.

15. The method of claim 12, wherein the tweak value comprises a random, non-zero value.

16. The method of claim 12, wherein each first intermediate output value, of the plurality of first intermediate output values, is based on a separate tweak value wherein each separate tweak value is a different value.

17. The method of claim 16, wherein each second intermediate output value, of the plurality of second intermediate output values, corresponds with a first intermediate output value and wherein each second intermediate output value is based on an inverse of the separate tweak value of the corresponding first intermediate output value.

18. The method of claim 12, wherein the circuit is configured to perform a cryptographic algorithm.

19. The method of claim 12, wherein the plurality of first intermediate output values are obtained substantially in parallel.

20. The method of claim 12, wherein the second output value is equal to the first output value.

21. The method of claim 12, wherein the second output value comprises a random value.

22. A non-transitory computer-readable medium having stored thereon instructions that, when executed by a processor system, cause the processor system to:
provide an input value to circuit that generates to generate a first output value;
obtain a tweak value;
obtain a plurality of first intermediate output values, wherein the plurality of first intermediate output values are generated by the circuit based on a function of the first output value and the tweak value;
embed the plurality of first intermediate output values into a structure;
obtain a plurality of second intermediate output values, wherein the plurality of second intermediate output values are a function of the plurality of first intermediate output values, a random number, and an inverse of the tweak value;
determine a most common value of the plurality of second intermediate output values, wherein the most common value represents a fault injection resistant value or a random value;
obtain a third intermediate value, the third intermediate value based on a function of the most common value and an inverse of the random number;
project the third intermediate value from the structure to obtain a second output value; and
output the second output value.

23. The non-transitory computer-readable medium of claim 22, wherein the structure comprises a field, wherein the field comprises a set of integers expressed in a number of binary bits, and wherein, to embed the plurality of first intermediate output values into the structure, the instructions cause the processor system to expand the plurality of first intermediate output values from a first bit space into a second bit space that is larger than the first bit space.

24. The non-transitory computer-readable medium of claim 22, wherein, to project the third intermediate value from the structure, the instructions cause the processor system configured to convert the third intermediate value from a second bit space to a first bit space.

25. The non-transitory computer-readable medium of claim 22 wherein the tweak value comprises a random, non-zero value.

26. The non-transitory computer-readable medium of claim 22, wherein each first intermediate output value, of the plurality of first intermediate output values, is based on a separate tweak value wherein each separate tweak value is a different value.

27. The non-transitory computer-readable medium of claim 26, wherein each second intermediate output value, of the plurality of second intermediate output values, corresponds with a first intermediate output value and wherein each second intermediate output value is based on an inverse of the separate tweak value of the corresponding first intermediate output value.

28. The non-transitory computer-readable medium of claim 22, wherein the circuit is configured to perform a cryptographic algorithm.

29. The non-transitory computer-readable medium of claim 22, wherein the plurality of first intermediate output values are obtained substantially in parallel.

30. The non-transitory computer-readable medium of claim 22, wherein the second output value is equal to the first output value.

31. The non-transitory computer-readable medium of claim 22, wherein the second output value comprises a random value.

\* \* \* \* \*